Jan. 30, 1945.  L. B. FASICK  2,368,127
FERTILIZER DISTRIBUTOR
Filed Feb. 13, 1943
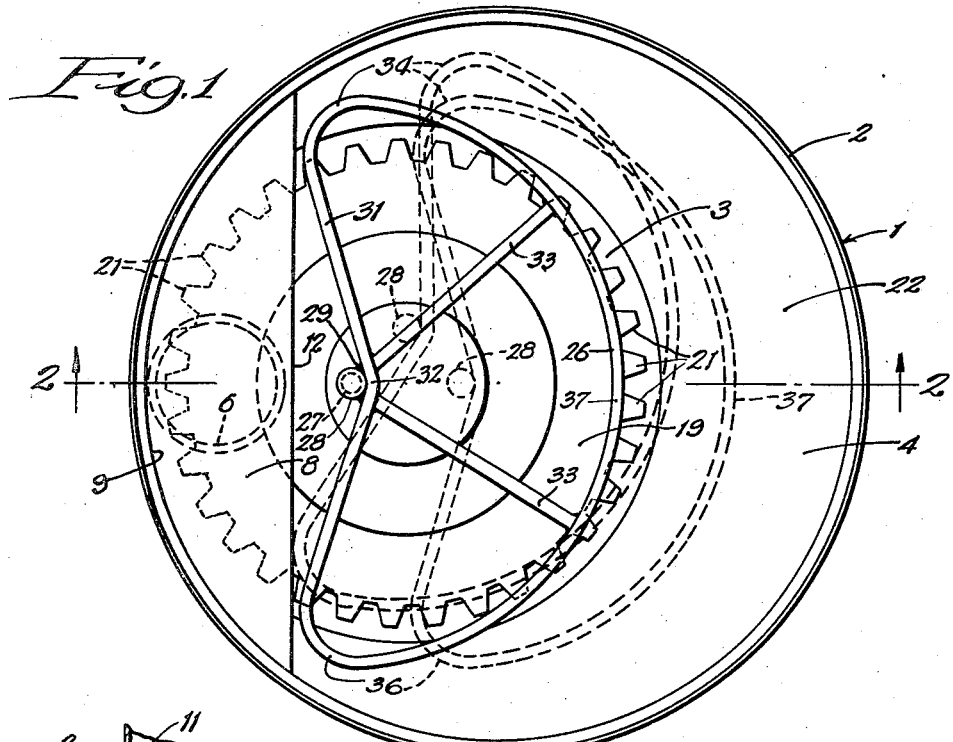
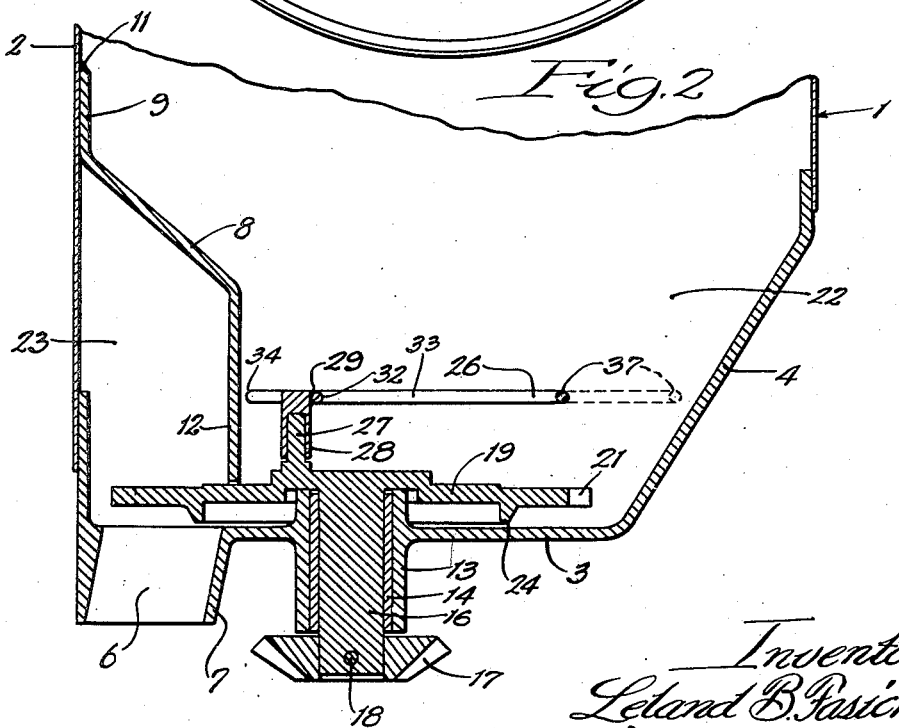
Inventor:
Leland B. Fasick,
By Paul O. Rippel
Attorney.

Patented Jan. 30, 1945

2,368,127

UNITED STATES PATENT OFFICE 2,368,127

FERTILIZER DISTRIBUTOR

Leland B. Fasick, Richmond, Ind., assignor to International Harvester Company, a corporation of New Jersey Application February 13, 1943, Serial No. 475,766

4 Claims. (Cl. 222—232)

This invention relates to a new and improved fertilizer distributor and has for one of its principal objects the provision of causing effective agitation of fertilizer so that proper and uniform distribution of the same may be continuously made.

Fertilizer distributors are customarily employed on agricultural implements such as seeders or the like and are for the express purpose of depositing fertilizer adjacent the seeds planted by the seeder. The fertilizer distributor generally takes the form of a hopper, which is adapted to be filled with fertilizer and which is supplied with an opening in its bottom so that the fertilizer may drop from the hopper opening to the ground. In order to obtain a continuous dropping of fertilizer, it has been found necessary to employ means for agitating the fertilizer within the hopper so that it will not become clogged in its passing out of the relatively restricted apertures in the bottom. In the past these agitators have taken many forms and still no one apparently has designed a successful agitator which will guarantee the desired uniform flow of dropping fertilizer.

It is, therefore, an important object of this invention to provide an agitator for operation within a hopper capable of dispensing fertilizer.

A further important object of this invention is the provision of a substantially gyrating agitator for use in the breaking up of compressed fertilizer to enable free and easy distribution of the fertilizer.

A still further important object of this invention is to provide a simple and economical agitator for employment within fertilizer distributing hoppers.

Another and still further important object of this invention is to provide a means of agitation for any substance requiring such agitation for the prevention of caking or clogging of the substance in the process of its being dispensed.

Other and further important objects of this invention will become apparent from the disclosures in the following specification and accompanying drawing, in which:

Figure 1 is a top plan view of the dispensing hopper employed in this invention; and Figure 2 is a sectional view taken on the line 2—2 of Figure 1.

As shown in the drawing, the reference numeral 1 indicates generally a hopper employed for fertilizer distribution. The hopper is composed of an upper cylindrical housing 2, a lower bottom portion 3 having an inclined side wall 4.

The bottom member 3 is equipped with an aperture 6 surrounded by a neck member 7. Within the housing is positioned a partition 8 being fixedly attached at its upper end 9 to the cylindrical housing 2 by means of a weld 11 or any other suitable attaching means. A lower depending skirt-like portion 12 of the partition 8 is suspended at some point above the bottom member 3, so that it forms no fixed attachment.

Also within the bottom member 3 is supplied a hub 13 having a bearing lining 14 within which is journaled a shaft 16. The lower end of the shaft 16 has a pinion gear 17 attached thereto by means of a pin 18. This pinion gear 17 is driven from an external source and, in turn, causes rotation of the shaft 16 for the operation of the agitating elements within the hopper 1.

The upper portion of the shaft 16 terminates in a disk-like element 19, which has a diameter substantially as large as the diameter of the lower portion of the hopper. The disk member 19 has its circumference equipped with teeth-like members 21, which are capable of causing transportation of the fertilizer within the main portion 22 of the hopper to a portion 23 of the hopper defined by the partition 8. This disk-like member 19 has the appearance of a gear and is supplied with various offset portions on its upper surface, and has an annular flange 24 on its under surface, which depends downwardly to a point just above the bottom 3 of the hopper. This flange prevents the major portion of the hopper contents from gaining contact with the hub and bearing members 13 and 14, respectively. Such guarding of these journaling members provides for continuous uninterrupted rotation of the disk-like member 19. It will be noted that the dispensing aperture 6 within the bottom 3 of the hopper 1 is immediately below the portion 23 of the hopper which is covered by the partition 8. Hence, no material within the hopper may drop directly from the main chamber 22 of the hopper through the aperture 6 without being transported by the teeth 21 of the disk-like member 19 to the chamber 23.

Persons unfamiliar with fertilizer distributors of the nature just described would be led to believe that continuous rotation of such an irregular disk-like member 19 would provide sufficient agitation in itself to enable the teeth 21 to be filled and refilled continuously as the disk 19 rotates. Such is not the case, as the consistency of most solid fertilizers would permit the removal of fertilizer superadjacent the member 19 without the fertilizer above tending to replace the removed portions unless some additional downward force is applied or the fertilizer is additionally agitated.

The particular additional agitation employed in the device of this invention takes the form of a wire agitator 26 which is mounted so that it has a semi-gyratory action. A stud 27 forms a unitary part of the disk-like member 19 and is offset from the rotational center of the member 19. A socket member 28 is adapted to be journally mounted upon the stud 27 for free rotation thereof. The substantially semicylindrical wire agitator 26 is attached by means of a weld 29, or the like, to the socket member 28. The diametral side 31 of the substantially semicylindrical wire agitator 26 is indented at its midpoint 32 to give more support to the weld 29 between that member and the socket member 28. Further, the resultant shape of the wire agitator with this indented side, as shown at 32, is more conducive to effective agitation. The wire agitator 26 is reenforced by means of spokes or the like 33, which extend from the apex 32 of the indented diametral side to the circumference of the semicircle.

The gyratory motion of the wire agitator 26 is obtained by rotation of the eccentrically positioned stud 27 on the disk-like member 19. The successive positions of the wire agitator are more clearly shown by the dashed lines in Figure 1. The wire agitator, shown in its starting position in full lines in Figure 1, has its small circular apices 34 and 36 at relatively the same distance from the partition 8. Assume now that the disk member 19 and its unitary eccentric stud 27 rotate through an angle of 90°. It will be seen that the circular apex 36 has rotated until it is in direct contact with the partition 8 and that the circular apex 34 has been thrown outwardly, so that it stirs up fertilizer or other material to be agitated which is positioned close to the walls of the hopper. A continued 90° rotation of the wire agitator 26, as shown in the second dashed line position in Figure 1, shows that the outer circumference portion 37 has reached its maximum position with respect to the inclined wall 4, and, as best shown in Figure 2, not much fertilizer will be left unagitated by reason of the close proximity of the portion 37 of the agitator 26 with the inclined wall 4. As the crank pin or eccentric stud rotates, the weight of the fertilizer on the wire frame member 26 tends to hold one side of the agitator while the opposite side rotates to a point where the round corners, either 34 or 36, on the opposite side of the wire contact the depending wall 12 of the partition member 8. The operation is then reversed, since that side of the wire agitator remains stationary and the other side moves about it, insuring movement over the entire surface on this plane of the hopper. The wire agitator is prohibited from ever completely rotating by reason of the partition 8 and for that reason particularly acts as an efficient agitator in that its movement is jerky and somewhat gyratory. If some hard foreign element were to get in with the fertilizer or other substance to be dispensed, the wire agitator is sufficiently flexible that operation may continue without breakage of parts.

I am aware that numerous details of construction may be varied over a wide range without departing from the principles disclosed herein, and I, therefore, do not propose limiting the patent granted hereon otherwise than as necessitated by the prior art.

What is claimed is:

1. A fertilizer dispenser comprising a hopper having an outlet in the bottom thereof, a partition in said hopper shielding said outlet, a disc-like member having radially extending teeth and positioned in the bottom of the hopper above the outlet and beneath the partition, the said disc-like member adapted to be rotated about its center, a stud unitary with the said disc-like member and extending upwardly therefrom at a point away from its center, a substantially semicircular shaped wire agitator, a bearing affixed to said wire agitator at its approximate radial center, the said bearing loosely receiving said stud, whereby the fertilizer is constantly agitated by the gyration of the wire agitator to cause spaces between the teeth on the disc-like member to fill and be transported by rotation to a position over said outlet whereupon it drops.

2. A fertilizer dispensing hopper having a restricted aperture in the bottom thereof, a partition in said hopper shielding said aperture, a gear-like rotating member in the bottom of said hopper extending beneath said partition, an upwardly extending journaling projection positioned off-center on said gear-like rotating member, a substantially semicircular wire agitator peripherally enclosed, and a bearing socket welded integrally with the periphery of the wire agitator and loosely receiving the journaling projection on said rotating member, whereby the wire agitator is caused to gyrate about the lower portion of the hopper.

3. A dispensing hopper having a restricted aperture in the bottom thereof, a partition within said hopper shielding said aperture, a rotating disc member adjacent the bottom of said hopper extending beneath said partition, an eccentrically positioned stud on said rotating member, an irregularly shaped wire agitator substantially semicircular in shape and having its diametral side indented at its center so that its component radii include something less than a straight angle, a bearing socket unitarily affixed to said center and loosely receiving the stud on said rotating member, whereby the wire agitator is limited to partial gyration because of said partition.

4. A dispenser comprising a receptacle having a restricted outlet on the bottom thereof, a partition in said hopper shielding said outlet, a disc-like member having radially extending teeth adapted to be rotated within the hopper, a stud unitary with said disc-like member extending upwardly therefrom at a point off-center, a substantially semicircular shaped spoked wire agitator, and a bearing socket affixed to said wire agitator at its approximate radial center, the said bearing loosely receiving said stud, whereby fertilizer within the receptacle is constantly agitated so that the teeth on the disc-like member will carry material within the hopper to a point above said restricted outlet.

LELAND B. FASICK.